(12) United States Patent
Kim et al.

(10) Patent No.: US 10,119,248 B2
(45) Date of Patent: Nov. 6, 2018

(54) GUARDRAIL FOR CONSTRUCTION EQUIPMENT

(71) Applicant: VOLVO CONSTRUCTION EQUIPMENT AB, Eskilstuna (SE)

(72) Inventors: Seok Won Kim, Busan (KR); Jin Suk Park, Gyeongsangnam-do (KR); Han Choul Shin, Gyeongsangnam-do (KR); Hyun Woo Yeom, Daegu (KR); Hyun Bin Ahn, Busan (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 15/317,732

(22) PCT Filed: Jun. 11, 2014

(86) PCT No.: PCT/KR2014/005103
§ 371 (c)(1),
(2) Date: Dec. 9, 2016

(87) PCT Pub. No.: WO2015/190626
PCT Pub. Date: Dec. 17, 2015

(65) Prior Publication Data
US 2017/0130425 A1    May 11, 2017

(51) Int. Cl.
*E04G 21/32* (2006.01)
*E02F 9/08* (2006.01)
(Continued)

(52) U.S. Cl.
CPC ............ *E02F 9/0833* (2013.01); *B60R 3/005* (2013.01); *E02F 9/24* (2013.01); *E04G 21/32* (2013.01)

(58) Field of Classification Search
CPC ........... E02F 9/0833; E02F 9/24; B60R 3/005
See application file for complete search history.

(56) References Cited

U.S. PATENT DOCUMENTS 4,441,568 A * 4/1984 Heffner ............... G01G 19/44
                                                    177/129
2015/0291101 A1* 10/2015 Koshy ................ E02F 9/0816
                                                    280/727

FOREIGN PATENT DOCUMENTS

EP        2578774 A2 *  4/2013  ............... E04G 5/14
JP        2009227213 A   10/2009
(Continued)

OTHER PUBLICATIONS

International Search Report for Application No. PCT/KR2014/005103 dated Feb. 16, 2015.

*Primary Examiner* — Alvin C Chin-Shue
(74) *Attorney, Agent, or Firm* — Lerner, David, Littenberg, Krumholz & Mentlik, LLP (57) ABSTRACT

The present invention relates to a guardrail for construction equipment. More specifically, the present invention relates to a guardrail for construction equipment that can adjust the overall height thereof, for example, to satisfy a height limit when a cargo ship is loaded with construction equipment, thereby increasing the amount of loaded construction equipment to reduce a transportation cost. To this end, the present invention provides a guardrail for construction equipment, comprising: a lower guardrail fixed to the edge of an upper body of the construction equipment; an upper guardrail connected to the lower guardrail; and a connecting part that is formed between the lower and upper guardrails to connect the lower and upper guardrails and enables the upper guardrail to move toward the lower guardrail, thereby adjusting the overall height made by the lower and upper guardrails.

2 Claims, 9 Drawing Sheets

(51) Int. Cl.
*B60R 3/00* (2006.01)
*E02F 9/24* (2006.01)

(56) References Cited

FOREIGN PATENT DOCUMENTS

| | | | |
|---|---|---|---|
| JP | 2010150835 | A | 7/2010 |
| KR | 100608308 | B1 | 8/2006 |
| KR | 20100090451 | A | 8/2010 |
| KR | 20130112476 | A | 10/2013 |

* cited by examiner

GUARDRAIL FOR CONSTRUCTION EQUIPMENT

CROSS-REFERENCE TO RELATED APPLICATION

This application is a national phase entry under 35 U.S.C. § 371 of International Application No. PCT/KR2014/005103, filed Jun. 11, 2014, published in Korean, the disclosure of which is incorporated herein by reference.

TECHNICAL FIELD

The present disclosure relates to a guardrail for construction equipment. More particularly, the present disclosure relates to a guardrail for construction equipment, wherein the height of the guardrail is adjustable to satisfy height limitations, for example, in the case that construction equipment is shipped on a freighter, so that a greater number of pieces of construction equipment can be shipped simultaneously, thereby reducing transportation costs.

BACKGROUND ART

In general, construction equipment, such as excavators, is exposed to large workloads and large vibration loads due to the working characteristics thereof. Thus, working loads generated by a working unit or an engine during operations of construction equipment are commonly transferred to the entirety of construction equipment, so that components of construction equipment are subjected to large loads. In addition, the components of construction equipment subjected to excessive vibration loads are at great risk of fracture due to fatigue caused by vibration loads accumulated during operations, and in effect, are frequently fractured. Accordingly, ensuring high resistance to vibration loads first must be considered when designing the components of construction machines.

Among such components of construction equipment, a guardrail is a structure directly providing safety to an operator of, or a mechanic working on, construction equipment. For example, when refueling or maintenance is performed during operation of construction equipment, the guardrail provides safety to the operator or mechanic. In general, the guardrail is disposed to be higher than a variety of other structures of construction equipment to realize safety and is formed of a single frame fixed to construction equipment to endure vibration loads.

Large construction machines, such as excavators, are generally shipped and carried on freighters to be transported abroad. Here, such freighters commonly have height limitations for the purpose of maximum shipment capacity. However, the guardrails of the related art, disposed on construction machines, are significantly high and thus cannot satisfy such height limitations. This consequently reduces the number of individual construction machines that can be shipped simultaneously, thereby significantly increasing transportation costs. Accordingly, the heights of guardrails have a significant effect on the number of construction machines that can be shipped simultaneously.

In the related art, when construction equipment is to be shipped, an additional operation of detaching guardrails from construction equipment has been performed to satisfy such height limitations. In this case, however, the problem of additional costs occurs. In addition, after transportation, detached guardrails must be reattached to construction equipment. Accordingly, in the related art, there have been significant difficulties and inconveniences in the transportation of construction equipment using freighters.

DISCLOSURE

Technical Problem

Accordingly, the present disclosure has been made in consideration of the above problems occurring in the related art, and the present disclosure proposes a guardrail for construction equipment, wherein the height of the guardrail is adjustable to satisfy height limitations, for example, in the case that construction equipment is shipped on a freighter, so that a greater number of construction machines can be shipped simultaneously, thereby reducing transportation costs.

Technical Solution

According to an aspect of the present disclosure, a guardrail for construction equipment may include: a lower guardrail part fixed to an edge of an upper structure of construction equipment; an upper guardrail part connected to an upper portion of the lower guardrail part; and a connector disposed between the lower guardrail part and the upper guardrail part to connect the lower guardrail part and the upper guardrail part, the connector allowing the upper guardrail part to move in a direction of the lower guardrail part such that a height of the guardrail including the upper guardrail part and the lower guardrail part is adjustable.

The connector may allow the upper guardrail part to be held in a position in which the upper guardrail part is erected over the lower guardrail part, and to pivot to another position in which the upper guardrail part is held to overlap the lower guardrail part.

The connector may include: a first hinge plate having a bottom surface coupled to the lower guardrail part; a second hinge plate overlapping the first hinge plate and having a top surface coupled to the first hinge plate; and a hinge shaft connected to the first hinge plate and the second hinge plate, the hinge shaft allowing the second hinge plate to pivot.

The connector may further include a fastening member configured to fasten the first hinge plate and the second hinge plate to each other when the second hinge plate is laid on the first hinge plate.

The connector may include: a first bracket coupled to an upper portion of the lower guardrail part; a second bracket coupled to a lower portion of the upper guardrail part and movably connected to the first bracket; and fastening members each fastening the first bracket and the second bracket to each other.

The first bracket may have a first fastening hole and a second fastening hole arranged in a longitudinal direction thereof, one of the fastening members being fastened to the first fastening hole, the other of the fastening members being fastened to the second fastening hole, the second bracket may have a third fastening hole corresponding to the first fastening hole of the first bracket and a fourth fastening hole corresponding to the second fastening hole of the first bracket, and the first fastening hole of the first bracket may allow the one of the fastening members to slide in a horizontal direction.

The connector may allow the upper guardrail part to slide in a top-bottom direction with respect to the lower guardrail part acting as a fixed shaft.

The connector may include: a first bracket connecting one side of the lower guardrail part and one side of the upper guardrail part; and a second bracket connecting the other side of the lower guardrail part and the other side of the upper guardrail part.

The first bracket may be welded to the lower guardrail part and may be connected to the upper guardrail part using a bolt.

The first bracket may have a rail hole to guide a movement of the bolt.

The rail hole may include a horizontal section, a first vertical section extending from one end of the horizontal section, and a second vertical section extending from the other end of the horizontal section to be parallel to and longer than the first vertical section.

The second bracket may be bolt-coupled to the lower guardrail part and the upper guardrail part.

Advantageous Effects

According to the present invention, the guardrail is provided with the connector allowing the upper guardrail part to move in the direction of the lower guardrail part when the height of the guardrail is to be reduced. It is thereby possible to easily adjust the height of the guardrail depending on situations. This can consequently satisfy the height limitations for maximum shipment in the case that construction equipment is shipped on a freighter, so that a greater number of construction machines can be shipped simultaneously. Unlike the conventional guardrail formed of a single frame that must be detached from construction equipment to satisfy the height limitations in the case that construction equipment is shipped on a freighter, it is possible to avoid a detachment process that would cause additional costs.

Thus, according to the present invention, it is possible to reduce transportation costs for construction equipment by easily adjusting the height of the guardrail.

In addition, according to the present invention, in the case that the upper guardrail part must be erected over the lower guardrail part, it is possible to fix the erected upper guardrail part using the connector, so that the upper guardrail part is not shaken by vibrations created during the operation of construction equipment, thereby preventing noise. When an operator or mechanic holds or leans against the guardrail after having climbed construction equipment to carry out work, the connectors or the connector can reliably support the weight of the operator or mechanic, thereby preventing any accidents related to the guardrail.

MODE FOR INVENTION

Hereinafter, reference will be made in detail to a guardrail for construction equipment according to embodiments of the present invention in conjunction with the accompanying drawings.

In the following description of the disclosure, detailed descriptions of known functions and components incorporated herein will be omitted in the case that the subject matter of the present disclosure is rendered unclear by the inclusion thereof.

As illustrated in FIG. 1 to FIG. 4, a guardrail 100 for construction equipment according to a first embodiment of the present invention is a safety structure disposed on an edge of an upper structure 10 of construction equipment, for example, an excavator, to prevent an operator or a mechanic from falling when the operator or the mechanic is working on the upper structure 10 of the excavator to refuel, repair, or maintain the excavator. In this regard, a plurality of guardrails 100 for construction equipment may be arranged in a line on an edge of the upper structure 10 of the excavator and/or may be disposed on both widthwise edges of the upper structure 10 of the excavator. That is, the guardrail 100 for construction equipment may be disposed on the entire edges of the upper structure 10 to provide a safe working and movement environment to the operator or the mechanic who has climbed the upper structure 10. In addition, to safely protect the operator or the mechanic, the guardrail 100 for construction equipment is formed such that the top thereof is higher than the top of a cab that is highest in the upper structure 10 of the excavator.

According to the first embodiment of the present invention, the guardrail 100 for construction equipment is configured such that the height thereof is adjustable to satisfy height limitations in the case of being shipped on a freighter. In this regard, the guardrail 100 for construction equipment according to the first embodiment of the present invention includes a lower guardrail part 110, an upper guardrail part 120, and connectors 130.

Figure 1:
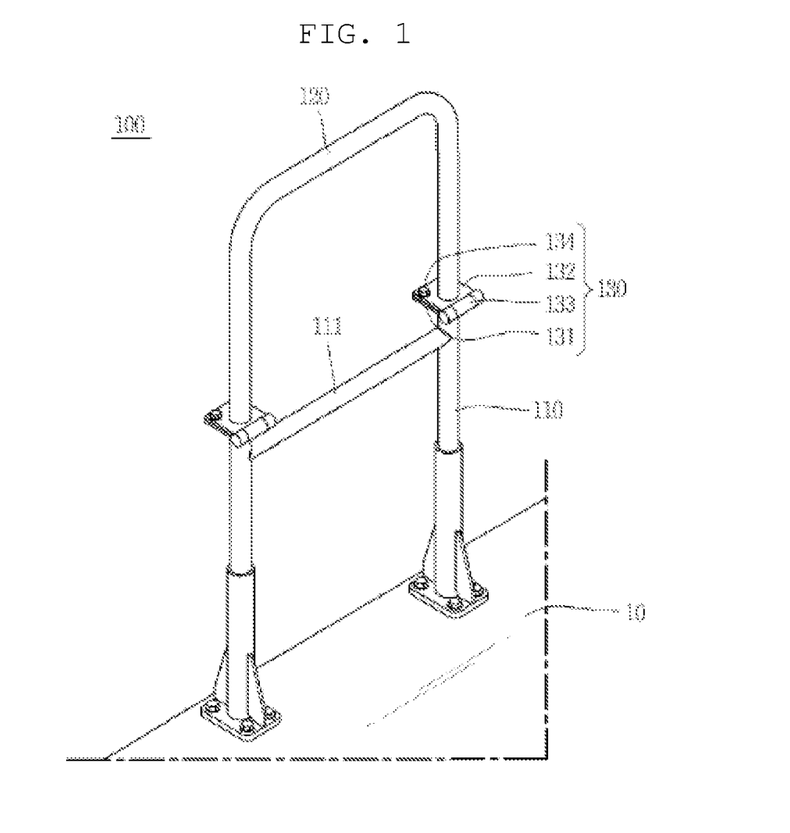
FIG. 1 is a perspective view illustrating a guardrail for construction equipment according to a first embodiment of the present invention.
Figure 2:
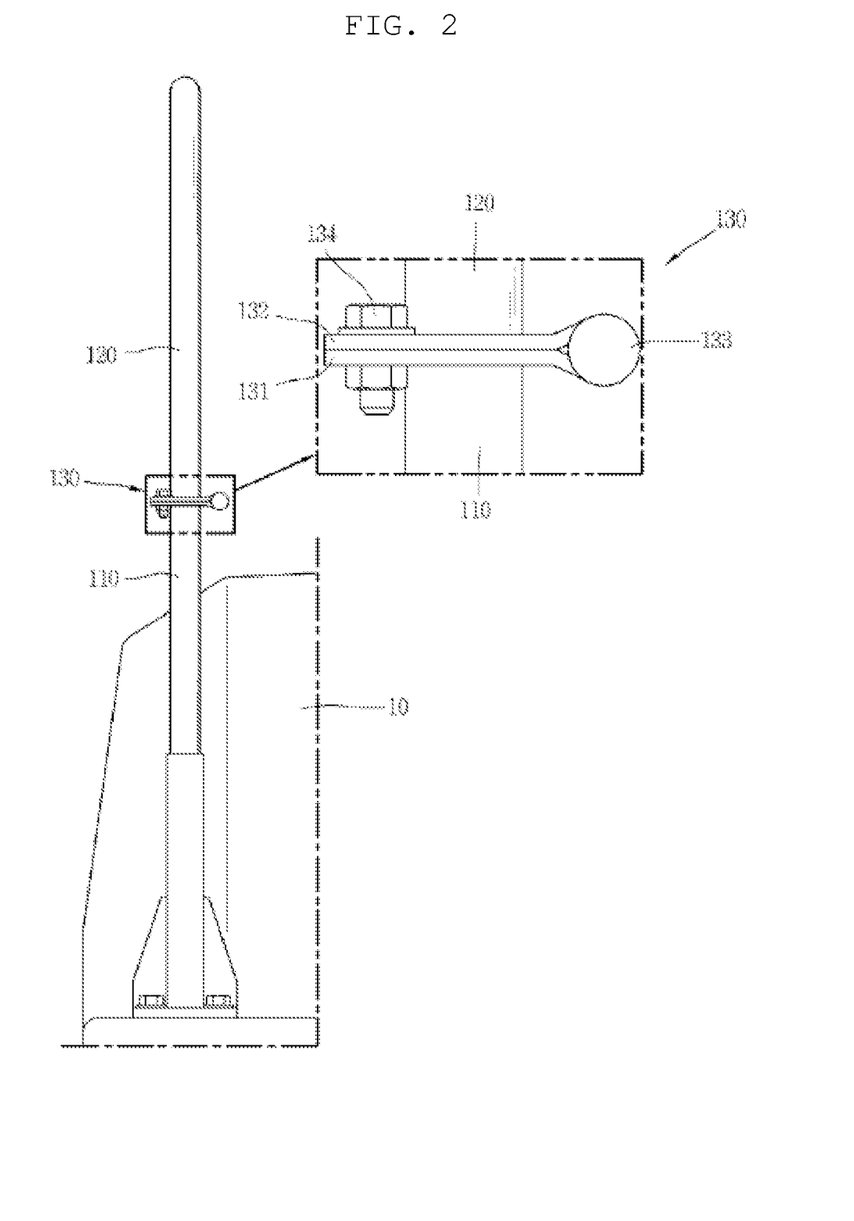
FIG. 2 is a side elevation view of FIG. 1.

The lower guardrail part 110 is fixed to the edge of the upper structure 10 of the excavator. Here, as illustrated in FIG. 1, the lower guardrail part 110 may be coupled to the upper structure 10 of the excavator using bolts. The lower guardrail part 110 is comprised of a pair of cylindrical bars arranged in the top-bottom direction to be in parallel to each other. A horizontal bar 111 may be provided between the pair of cylindrical bars of the lower guardrail part 110 to connect and support the pair of cylindrical bars.

The upper guardrail part 120 is connected to the lower guardrail part 110 to be on top of the lower guardrail part 110. Here, the upper guardrail part 120 according to the first embodiment of the present invention is connected to the top portion of the lower guardrail part 110 via the connectors 130 such that the upper guardrail part 120 is able to pivot in one direction, i.e. in the direction of the lower guardrail part 110. Due to this configuration, the upper guardrail part 120 is erected on the lower guardrail part 110 or overlaps the lower guardrail part 110, so that the height of the guardrail 100 can be adjusted. The upper guardrail part 120 is comprised of a pair of vertical cylindrical bars and a horizontal cylindrical bar, like the lower guardrail part 110. The vertical cylindrical bars are arranged in the top-bottom direction to be in parallel to each other. The horizontal cylindrical bar is disposed in the horizontal direction to connect the top ends of the vertical cylindrical bars, such that the operator or the mechanic can lean against or hold the horizontal cylindrical bar. That is, the upper guardrail part 120 is formed as a single cylindrical bar bent twice in the length direction thereof. Here, the pair of vertical cylindrical bars of the upper guardrail part 120 are collinearly positioned with the pair of vertical cylindrical bars of the lower guardrail part 110 in the top-bottom direction when the upper guardrail part 120 is erected on the lower guardrail part 110.

According to the first embodiment of the present invention, in the position in which the upper guardrail part 120 is erected on the lower guardrail part 110, the upper guardrail part 120 can be fixed by the connectors 130. When the erected upper guardrail part 120 is fixed by the connectors 130, noise by the upper guardrail part 120 shaken by vibrations created during the operation of the excavator can be prevented. In addition, when the operator or the mechanic holds or leans against the upper guardrail part 120 after having climbed the upper structure 10 of the excavator to carry out work, the upper guardrail part 120 can be reliably supported.

The connectors 130 are provided between the lower guardrail part 110 and the upper guardrail part 120 to connect the lower guardrail part 110 and the upper guardrail part 120. In addition, the connectors 130 allow the upper guardrail part 120 to move in the direction of the lower guardrail part 110, whereby the height of the guardrail 100 defined by the lower guardrail part 110 and the upper guardrail part 120 can be adjusted. According to the first embodiment of the present invention, in the case that an excavator is shipped on a freighter having limitations on the height of cargo to be shipped thereon, the connectors 130 allow the upper guardrail part 120 to pivot in the direction of the lower guardrail part 110 to overlap the lower guardrail part 110, whereby the height of the guardrail 100 can be reduced. In addition, when the operator or the mechanic has climbed the upper structure 10 of the excavator, the connectors 130 allow the upper guardrail part 120 to pivot in the opposite direction, so that the upper guardrail part 120 is erected on the lower guardrail part 110, to ensure the safety of the operator or the mechanic. Here, the connectors 130 stop the movement of the upper guardrail part 120 to ensure that the erected structure is reliable when the upper guardrail part 120 pivotably connected to the lower guardrail part 110 by the connectors 130 is erected. That is, the connectors 130 hold the upper guardrail part 120 in the erected position.

According to the first embodiment of the present invention, each of the connectors 130 includes a first hinge plate 131, a second hinge plate 132, and a hinge shaft 133.

Here, the lower guardrail part 110 is coupled to the bottom surfaces of the first hinge plates 131 (in the drawing). Specifically, the first hinge plates 131 are coupled to the top ends of the pair of cylindrical bars of the lower guardrail part 110. In addition, the upper guardrail part 120 is coupled to the top surfaces of the second hinge plates 132. Specifically, the second hinge plates 132 are coupled to the bottom ends of the pair of cylindrical bars of the upper guardrail part 120.

Figure 3:
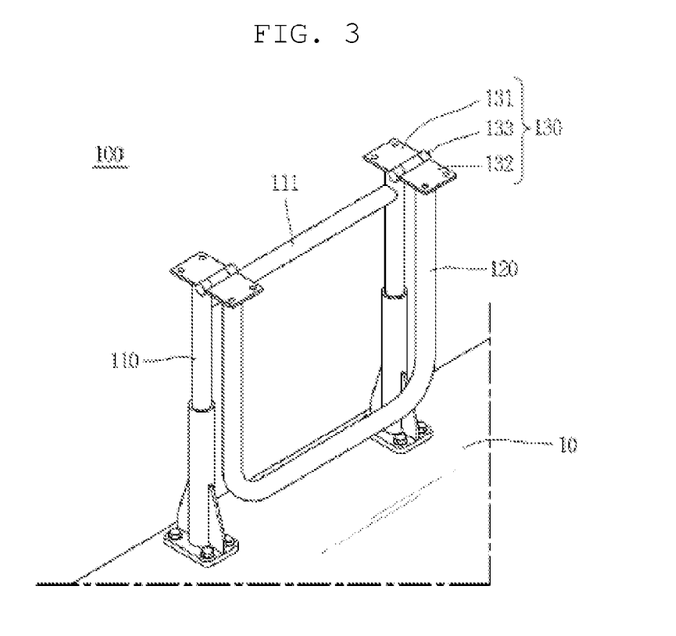
FIG. 3 is a perspective view illustrating a folded position of the guardrail for construction equipment according to the first embodiment of the present invention.
Figure 4:
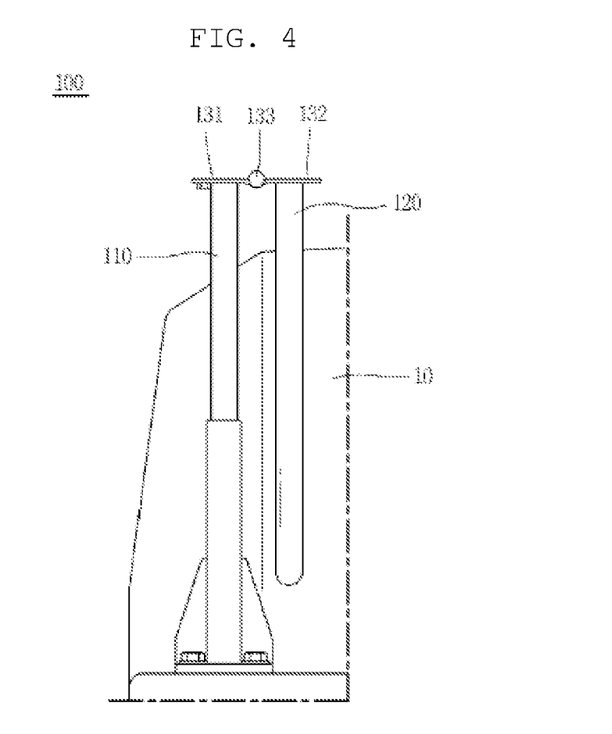
FIG. 4 is a side elevation view of FIG. 3.
Figure 5:
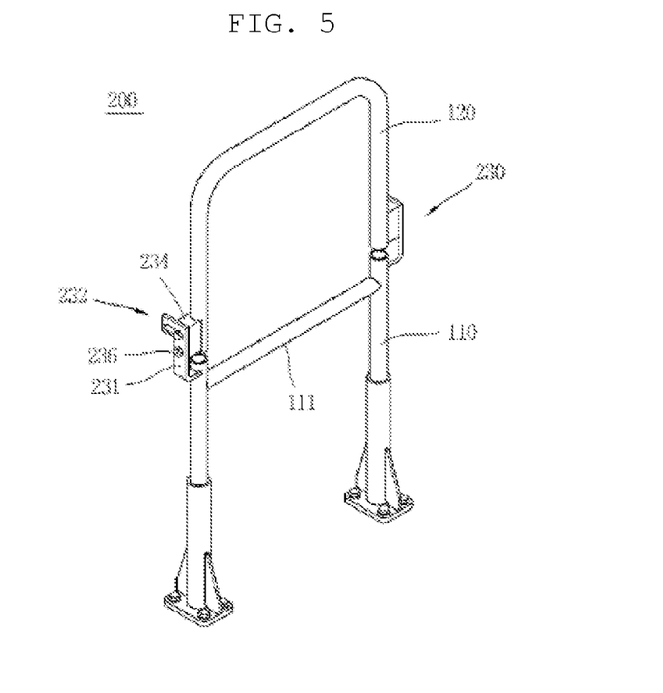
FIG. 5 is a perspective view illustrating a guardrail for construction equipment according to a second embodiment of the present invention.
Figure 6:
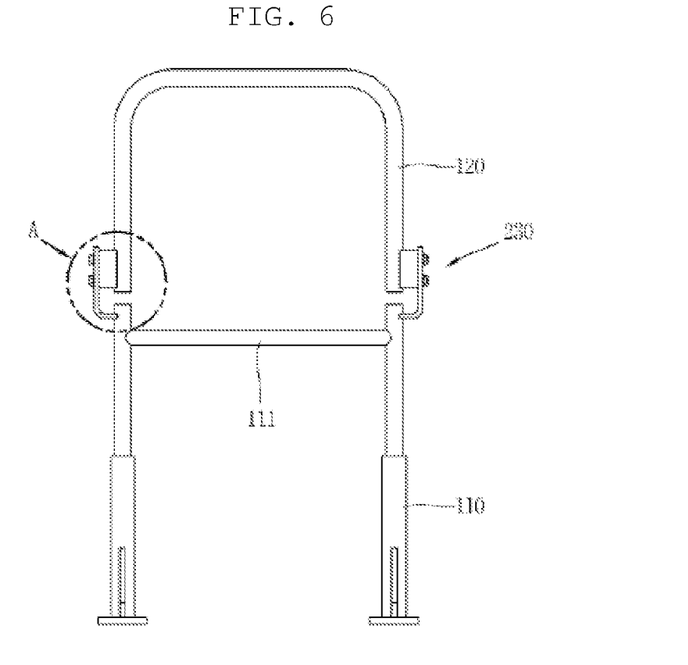
FIG. 6 is a front elevation view of FIG. 5.
Figure 7:
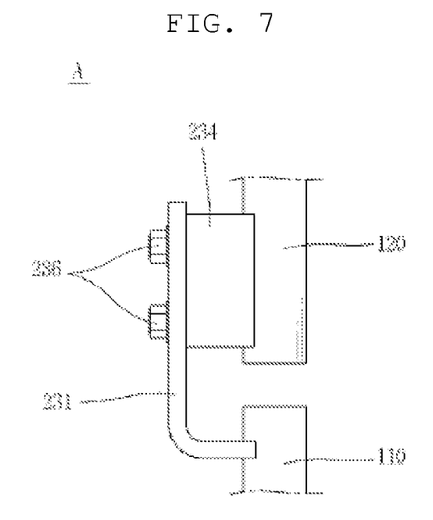
FIG. 7 is a partially enlarged view of part "A" in FIG. 6.
Figure 8:
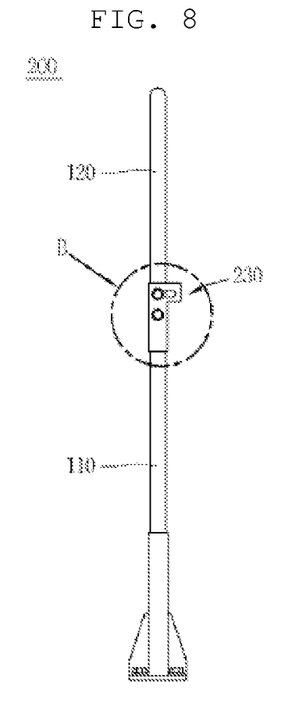
FIG. 8 is a side elevation view of FIG. 5.
Figure 9:
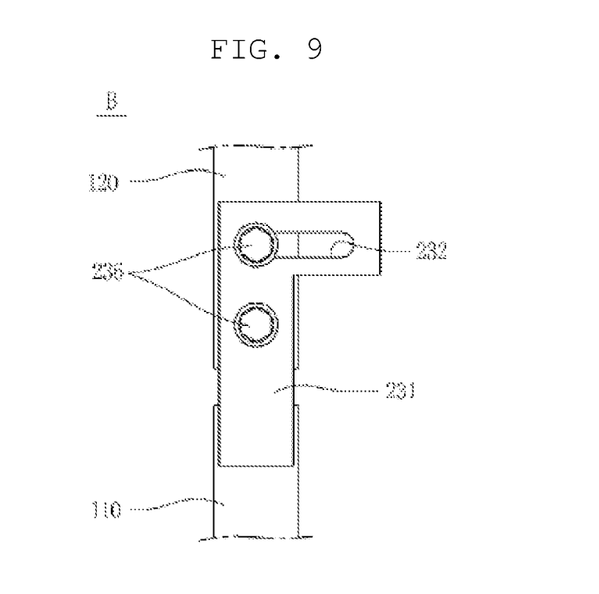
FIG. 9 is a partially enlarged view of part "B" in FIG. 8.
Figure 10:
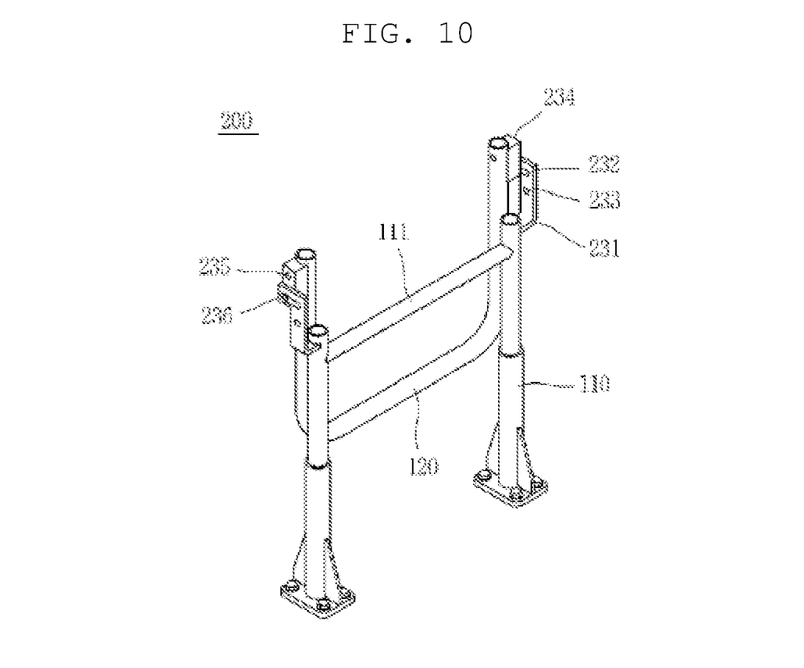
FIG. 10 is a perspective view illustrating a folded position of the guardrail for construction equipment according to the second embodiment of the present invention.
Figure 11:
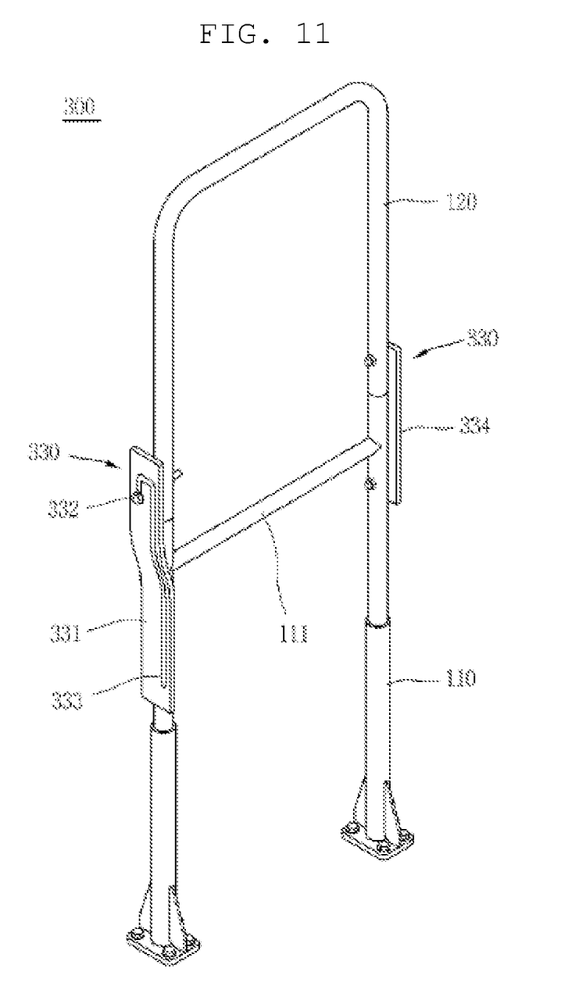
FIG. 11 is a perspective view illustrating a guardrail for construction equipment according to a third embodiment of the present invention.
Figure 12:
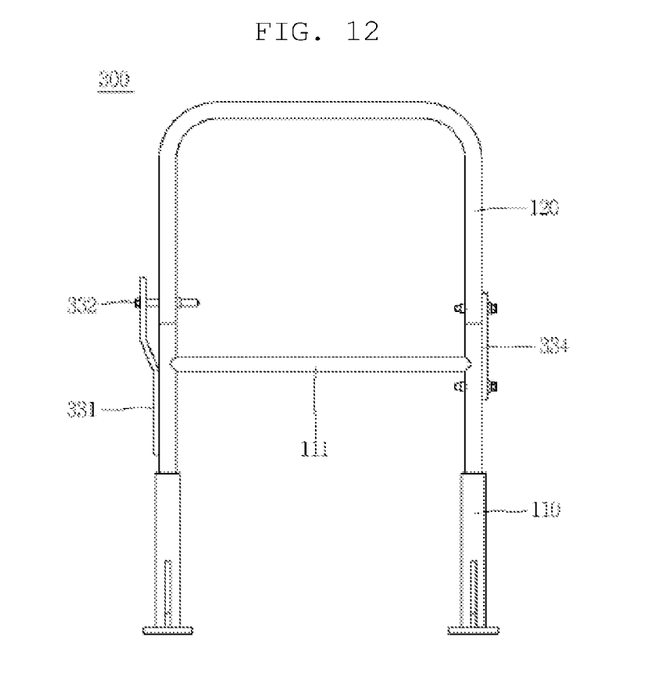
FIG. 12 is a front elevation view of FIG. 11.

The first hinge plate 131 and the second hinge plate 132 in each connector are connected to each other via a hinge shaft 133. When the first hinge plate 131 and the second hinge plate 132 are disposed to be laid on each other in the top-bottom direction as illustrated in FIG. 1, the upper guardrail part 120 is erected. Here, a fastening member 134, such as a bolt, may be used to fasten the first hinge plate 131 and the second hinge plate 132 to each other to prevent the upper guardrail part 120 from shaking when the second hinge plate 132 is laid on the first hinge plate 131, i.e. the upper guardrail part 120 is erected on the lower guardrail part 110. In addition, as illustrated in FIG. 3, when the second hinge plate 132 coupled to the upper guardrail part 120 pivots 180° about the hinge shaft 133 such that the first and second hinge plates 131, 132 are unfolded, the upper guardrail part 120 overlaps the lower guardrail part 110.

Hereinafter, the operation of the guardrail for construction equipment according to the first embodiment of the present invention will be described.

In the case that an excavator having the guardrail 100 according to the first embodiment of the present invention disposed on the upper structure 10 thereof is to be shipped on a freighter, the upper and lower guardrail parts 120 and 110 are folded to satisfy the height limitations of the freighter. First, the fastening member 134 is unfastened from the first hinge plate 131 and the second hinge plate 132 laid on each other in the top-bottom direction, so that the second hinge plate 132 can pivot about the hinge shaft 133. Afterwards, the upper guardrail part 120 coupled to the second hinge plate 132 is pivoted toward the lower guardrail part 110, so that the upper guardrail part 120 overlaps the lower guardrail part 110. The upper guardrail part 120 pivoted toward the lower guardrail part 110 as described above reduces the height of the guardrail 100 in a corresponding manner, whereby the height limitations of the freighter can be satisfied in the case that the excavator is shipped on the freighter.

After the transportation of an excavator has been completed, when the upper guardrail part 120 is pivoted in the opposite direction, the upper guardrail part 120 is erected on the lower guardrail part 110. Afterwards, when the fastening members 134 are fastened to the first hinge plate 131 and the second hinge plate 132 laid on each other in the top-bottom direction, the upper guardrail part 120 can be prevented from being pivoted again or shaking.

As described above, it is possible to easily adjust the height of the guardrail 100 for construction equipment according to the first embodiment of the present invention depending on situations using the connectors 130 with which the lower guardrail part 110 and the upper guardrail part 120 are hinge-coupled to each other.

Hereinafter, a guardrail for construction equipment according to a second embodiment of the present invention will be described with reference to FIG. 5 to FIG. 10.

As illustrated in FIG. 5 to FIG. 10, the guardrail 200 for construction equipment according to the second embodiment of the present invention includes a lower guardrail part 110, an upper guardrail part 120, and connectors 230.

The components of the second embodiment of the present invention are substantially identical to those of the first embodiment of the present invention, except for the structure of the connectors. The same components will be designated with the same reference numerals, and descriptions thereof will be omitted.

Like the connectors 130 according to the first embodiment of the present invention, the connectors 230 according to the second embodiment of the present invention allow the upper guardrail part 120 to pivot toward the lower guardrail part 110 to overlap the lower guardrail part 110. When the upper guardrail part 120 is erected over the lower guardrail part 110, the connectors 230 fix the erected upper guardrail part 120.

In this regard, each of the connectors 230 includes a first bracket 231, a second bracket 234, and fastening members 236. The first bracket 231 is coupled to the upper portion of the lower guardrail part 110. The second bracket 234 is coupled to the lower portion of the upper guardrail part 120 and is movably connected to the first bracket 231. The fastening members 236 fasten the first bracket 231 and the second bracket 234 to each other. Described in more detail, the first bracket 231 has a first fastening hole 232 and a second fastening hole 233 which are arranged in the longitudinal direction thereof. One of the fastening members 236 is fastened to the first fastening hole 232, and the other of the fastening members 236 is fastened to the second fastening hole 233. In addition, the second bracket 234 has a third fastening hole (not shown) corresponding to the first fastening hole 232 of the first bracket and a fourth fastening hole 235 corresponding to the second fastening hole 233 of the first bracket. Here, the first fastening hole 232 allows the fastening member 236 to slide thereinto in the horizontal direction. Due to this configuration, the fastening member 236 connected to the first fastening hole 232 of the first bracket and the third fastening hole (not shown) of the second bracket is guided by the first fastening hole 232 to allow the upper guardrail part 120 to slide in the horizontal direction while acting as a hinge shaft on which the upper guardrail part 120 can pivot toward the lower guardrail part 110. When the upper guardrail part 120 pivots after sliding in the horizontal direction as described above, the upper guardrail part 120 does not interfere with the lower guardrail part 110 during pivoting, whereby the height of the guardrail 200 for construction equipment can be more easily adjusted.

Hereinafter, the operation of the guardrail for construction equipment according to the second embodiment of the present invention will be described.

In the case that an excavator having the guardrail 200 according to the second embodiment of the present invention disposed on the upper structure (10 in FIG. 1) thereof is to be shipped on a freighter, the upper and lower guardrail part 120, 110 are folded to satisfy the height limitations of the freighter. First, the fastening members 236 are unfastened from the second fastening hole 233 of the first bracket 231 and the fourth fastening hole 235 of the second bracket 236. Afterwards, the upper guardrail part 120 is drawn in the horizontal direction, i.e. the direction away from the lower guardrail part 110, so that the fastening members 236 connected to the first fastening hole 232 of the first bracket 231 and the third fastening hole (not shown) of the second bracket 234 and connected to the upper guardrail part 120 via the second bracket 234 move along the slot-shaped first fastening hole 232 in the horizontal direction, i.e. the direction away from the lower guardrail part 110. Afterwards, when the upper guardrail part 120 is pivoted toward the lower guardrail part 110, the upper guardrail part 120 freely overlaps the lower guardrail part 110 without interfering with the lower guardrail part 110. Consequently, the height of the guardrail 200 can be reduced, thereby satisfying the height limitations of the freighter.

After the transportation of an excavator has been completed, when the upper guardrail part 120 is pivoted 180°, in the opposite direction, and is slid in the direction of the lower guardrail part 110, the upper guardrail part 120 is erected over the lower guardrail part 110. Afterwards, the fastening members 236 are fastened to the second fastening hole 233 of the first bracket 231 and the fourth fastening hole 235 of the second bracket 234 aligned in response to the upper guardrail part 120 being erected, so that the upper guardrail part 120 can be prevented from being pivoted again or shaking.

As described above, it is possible to easily adjust the height of the guardrail 200 for construction equipment according to the second embodiment of the present invention depending on situations using the connectors 230 with which the lower guardrail part 110 and the upper guardrail part 120 are hinge-coupled to each other, like the guardrail (100 in FIG. 1) for construction equipment according to the first embodiment.

Hereinafter, a guardrail for construction equipment according to a third embodiment of the present invention will be described with reference to FIG. 11 to FIG. 15.

As illustrated in FIG. 11 to FIG. 15, the guardrail 300 for construction equipment according to the third embodiment of the present invention includes a lower guardrail part 110, an upper guardrail part 120, and a connector 330.

The components of the third embodiment of the present invention are substantially identical to those of the first embodiment of the present invention, except for the structure of the connectors. The same components will be designated with the same reference numerals, and descriptions thereof will be omitted.

Differently from the connectors (130 in FIG. 1) according to the first embodiment of the present invention about which the upper guardrail part 120 pivots, the connector 330 according to the third embodiment of the present invention allows the upper guardrail part 120 to slide in the vertical direction toward the lower guardrail part 110, so that the height of the guardrail 300 can be adjusted. That is, according to the third embodiment of the present invention, the connector 330 allows the upper guardrail part 120 to slide in the vertical direction, i.e. the top-bottom direction, with respect to the lower guardrail part 110 acting as a fixed shaft.

In this regard, the connector 330 includes a first bracket 331 and a second bracket 334. The first bracket 331 is a member connecting one side of the lower guardrail part 110 to one side of the upper guardrail part 120. The first bracket 331 is welded to the lower guardrail part 110 while being connected to the upper guardrail part 120 using a bolt 332. In addition, the second bracket 334 is a member connecting the other side of the lower guardrail part 110 to the other side of the upper guardrail part 120. The second bracket 334 is connected to the lower guardrail part 110 and the upper guardrail part 120 using bolts. According to the third embodiment of the present invention, the first bracket 331 allows the upper guardrail part 120 to slide, while the second bracket 334 holds the upper guardrail part 120 through bolting connection. Specifically, when the upper guardrail part 120 is erected on the lower guardrail part 110, the portions of the lower guardrail part 110 and the upper guardrail part 120 to which the first bracket 331 is connected are configured to allow the upper guardrail part 120 to slide. This structure consequently allows the upper guardrail part 120 to move. Here, when vibrations are applied to the guardrail 300 during the operation of construction equipment, the upper guardrail part 120 may unintentionally move. In this regard, according to the third embodiment of the present invention, the second bracket 334 is provided on the other sides of lower guardrail part 110 and the upper guardrail part 120 to prevent the movement of the lower guardrail part 110 and the upper guardrail part 120.

Figure 13:
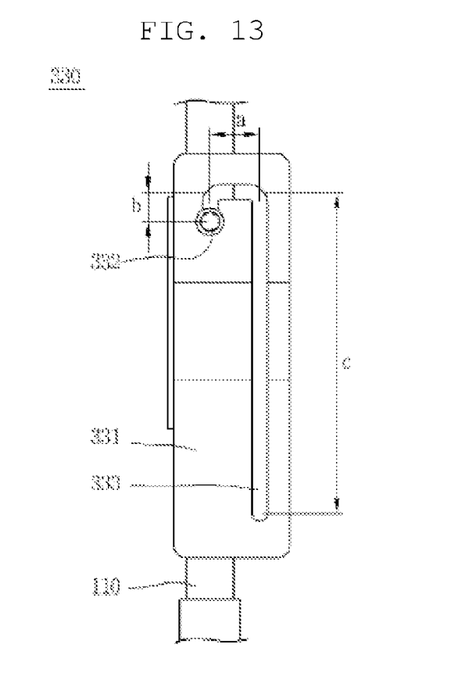
FIG. 13 is a partially enlarged view of a connector of the guardrail for construction equipment according to the third embodiment of the present invention.

In addition, the first bracket 331 has a rail hole 333 guiding the movement of the bolt 332 fastened to the upper guardrail part 120 to realize the sliding operation of the upper guardrail part 120. As illustrated in FIG. 13, the rail hole 333 is comprised of a horizontal section a, a first vertical section b, and a second vertical section c. The first vertical section b extends from one end of the horizontal section a, while the second vertical section c extends from the other end of the horizontal section a, to be parallel to and longer than the first vertical section b. Before the upper guardrail part 120 slides downwards, i.e. before the bolt 332 slides downwards along the second vertical section c, the horizontal section a allows the upper guardrail part 120 to move away from the lower guardrail part 110 so that the lower guardrail part 110 does not interfere with the upper guardrail part 120.

FIG. 13 illustrates the position of the bolt 332 in the rail hole 333 when the height of the guardrail 300 is greatest, due to the upper guardrail part 120 being erected on the lower guardrail part 110. That is, when the upper guardrail part 120 is erected, the bolt 332 is located in the lowermost end of the first vertical section b, with the downward movement thereof being stopped by the first vertical section b.

Figure 14:
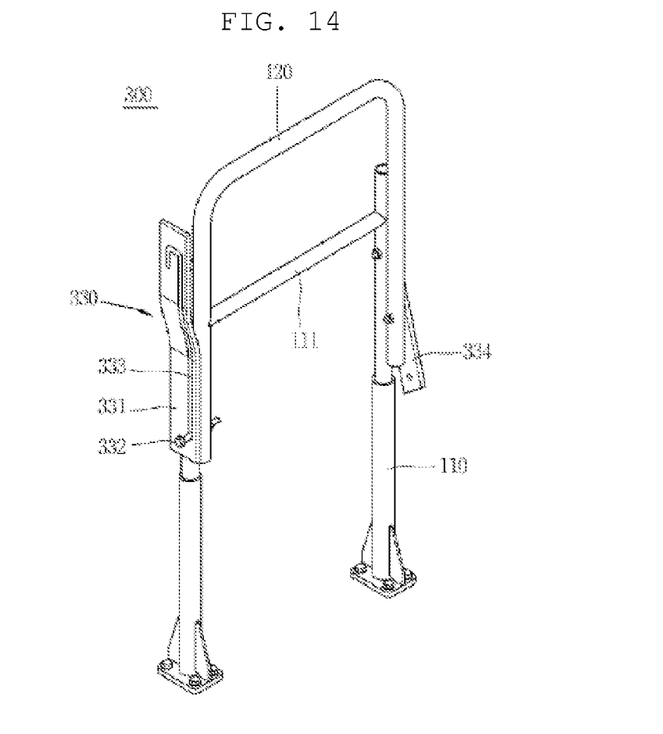
FIG. 14 is a perspective view illustrating a position in which the upper guardrail part is slid toward the lower guiderail in the guardrail for construction equipment according to the third embodiment of the present invention.
Figure 15:
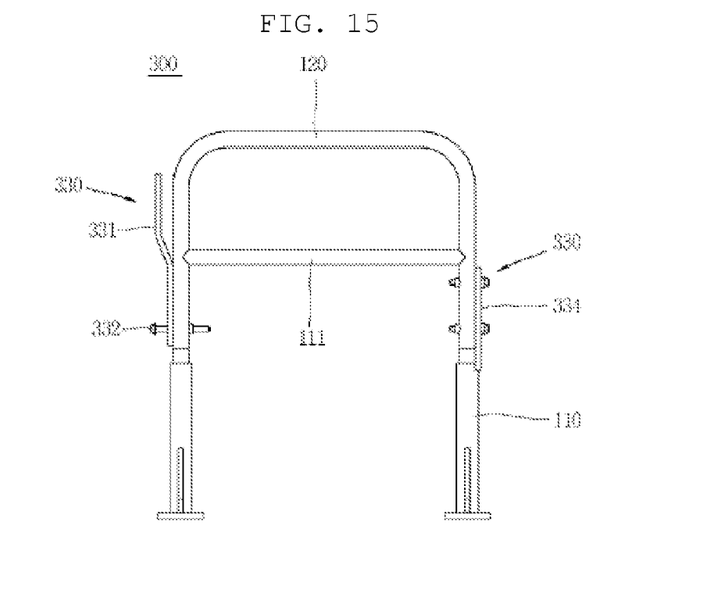
FIG. 15 is a front elevation view of FIG. 14.

In addition, as illustrated in FIG. 14 and FIG. 15, when the height of the guardrail 300 is adjusted to be the lowest in response to the upper guardrail part 120 sliding downwards, the bolt 332 is located at the lowest end of the second vertical section c after having moved along the first vertical section b, the horizontal section a, and the second vertical section c. In this position, further downward sliding movement is stopped by the second vertical section c.

Hereinafter, the operation of the guardrail for construction equipment according to the third embodiment of the present invention will be described.

In the case that an excavator having the guardrail 300 for construction equipment according to the third embodiment of the present invention disposed on the upper structure (10 in FIG. 10) thereof is shipped on a freighter, the upper guardrail part 120 is moved downwards to satisfy the height limitations of the freighter. First, the bolt fastened to the upper guardrail part 120 through the second bracket 334 is unfastened (i.e. the upper fastening bolt in the drawing), so that the upper guardrail part 120 is movable. Afterwards, the bolt 332 passing through the first bracket 331 and fastened to the upper guardrail part 120 is moved sequentially through the first vertical section b, the horizontal section a, and the second vertical section c of the rail hole 333 by moving the upper guardrail part 120. This changes the position of the upper guardrail part 120 to partially overlap the lower guardrail part 110, so that the height of the upper guardrail part 120 is reduced by the difference between the length of the second vertical section c and the length of the first vertical section a. This can consequently reduce the height of the guardrail 300, thereby satisfying the height limitations of the freighter. In this position, the second bracket 334 is pivoted, using the bolt fastened to the lower guardrail part 110 through the second bracket 334 (i.e. the lower fastening bolt in the drawing) as the pivot shaft, and then the upper guardrail part 120 is refastened to the second bracket 334 using the bolt, so that the upper guardrail part 120 that is slid toward the lower guardrail part 110 can be reliably fixed.

After the transportation of an excavator has been completed, the upper guardrail part 120 is unfastened from the second bracket 334, to which the upper guardrail part 120 has been bolt-fastened, and then is moved so that the bolt 332 moves sequentially along the paths of the second vertical section c, the horizontal section a, and the first vertical section b of the rail hole 333. Consequently, the upper guardrail part 120 is erected on the lower guardrail part 110, so that the height of the guardrail 300 is the greatest. Afterwards, the second bracket 334 is pivoted, using the bolt fastened to the lower guardrail part 110 through the second bracket 334 as the pivot shaft, and then the upper guardrail part 120 is fastened to the second bracket 334 using the bolt. This can consequently prevent the upper guardrail part 120 from shaking and moving out of the first vertical section b or pivoting about the bolt 332.

As described above, according to the third embodiment of the present invention, it is possible to easily adjust the height of the guardrail 300 for construction equipment using the connector 330 allowing the upper guardrail part 120 to slide toward the lower guardrail part 110.

As set forth above, in the guardrail 100, 200, or 300 for construction equipment according to the exemplary embodiments, the connectors 130 or 230 or the connector 330 allow the upper guardrail part 120 to pivot or slide toward the lower guardrail part 110. Accordingly, when construction equipment is shipped on a freighter having height limitations on maximum shipment heights, the guardrail 100, 200, or 300 can satisfy the height limitations, so that a greater number of construction machines can be shipped simultaneously, thereby reducing transportation costs.

In addition, in the case of the guardrail 100, 200, or 300 for construction equipment according to the exemplary embodiment, when the upper guardrail part 120 is erected over the lower guardrail part 110, it is possible to fix the upper guardrail part 120 using the connectors 130 or 230 or the connector 330, thereby preventing the upper guardrail part 120 from shaking during the operation of construction equipment.

The foregoing descriptions of specific exemplary embodiments of the present disclosure have been presented with respect to the drawings. They are not intended to be exhaustive or to limit the present disclosure to the precise forms disclosed, and obviously many modifications and variations are possible for a person having ordinary skill in the art in light of the above teachings.

It is intended therefore that the scope of the present disclosure not be limited to the foregoing embodiments, but be defined by the Claims appended hereto and their equivalents.

The invention claimed is:

1. A guardrail for construction equipment comprising:
a lower guardrail part attachable to a construction equipment;
an upper guardrail part connected to an upper portion of the lower guardrail part; and
a connector disposed between the lower guardrail part and the upper guardrail part to connect the lower guardrail part and the upper guardrail part, the connector allowing the upper guardrail part to move in a direction of the lower guardrail part such that a height of the guardrail including the upper guardrail part and the lower guardrail part is adjustable, the connector allowing the upper guardrail part to slide in a top-bottom direction with respect to the lower guardrail part acting as a fixed shaft, the connector including a first bracket and a second bracket, the first bracket connecting one side of the lower guardrail part and one side of the upper guardrail part, the second bracket connecting the other side of the lower guardrail part and the other side of the upper guardrail part, the first bracket being welded to the lower guardrail part and connected to the upper guardrail part using a bolt, the first bracket having a rail hole to guide a movement of the bolt, wherein the rail hole comprises a horizontal section, a first vertical section extending from one end of the horizontal section, and a second vertical section extending from the other end of the horizontal section to be parallel to an longer than the first vertical section.

2. The guardrail of claim 1, wherein the second bracket is bolt-coupled to the lower guardrail part and the upper guardrail part.

* * * * *